US011169839B2

(12) United States Patent
Gupta et al.

(10) Patent No.: US 11,169,839 B2
(45) Date of Patent: Nov. 9, 2021

(54) MANAGEMENT OF IOT DEVICES IN A VIRTUALIZED NETWORK

(71) Applicant: AT&T Intellectual Property I, L.P., Atlanta, GA (US)

(72) Inventors: Gaurav Gupta, Sammamish, WA (US); Vivek Mhatre, Bellevue, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/814,090

(22) Filed: Mar. 10, 2020

(65) Prior Publication Data
US 2020/0210221 A1 Jul. 2, 2020

Related U.S. Application Data

(63) Continuation of application No. 16/055,059, filed on Aug. 4, 2018, now Pat. No. 10,628,207, which is a
(Continued)

(51) Int. Cl.
*G06F 9/455* (2018.01)
*H04L 12/24* (2006.01)
(Continued)

(52) U.S. Cl.
CPC ...... *G06F 9/45558* (2013.01); *H04L 41/0893* (2013.01); *H04L 41/12* (2013.01);
(Continued)

(58) Field of Classification Search
CPC ....... G06F 9/45558; G06F 2009/45595; G06F 2009/4557; H04L 41/0893; H04L 41/12;
(Continued)

(56) References Cited

U.S. PATENT DOCUMENTS 8,443,069 B2\* 5/2013 Bagepalli .............. H04L 9/3242
709/223
9,100,371 B2 8/2015 Bagepalli et al.
(Continued)

FOREIGN PATENT DOCUMENTS

WO 2014182900 A1 11/2014

OTHER PUBLICATIONS

John Williamson. "Policy and security management in the IoT and network virtualization world", http://inform.tmforum.org/features-and-analysis/featured/2015/09/policy-and-security-management-in-the-iot-and-network-virtualization-world/ (Sep. 14, 2015).
(Continued)

*Primary Examiner* — Jimmy H Tran
(74) *Attorney, Agent, or Firm* — BakerHostetler

(57) ABSTRACT

Specialized, service optimized virtual machines are assigned to handle specific types of Internet of Things (IoT) devices. An IoT context mapping policy engine within the context of a virtualized network function manages IoT context mapping policy functions in load balancers. The IoT context mapping policy functions select service optimized virtual machines based on IoT device IDs, and assign those virtual machines to handle the devices. The IoT context mapping policy functions provide load data to the IoT context mapping policy engine. Based on the load data, the IoT context mapping policy engine maintains appropriate scaling by creating or tearing down instances of the virtual machines.

20 Claims, 6 Drawing Sheets

Related U.S. Application Data continuation of application No. 15/042,229, filed on Feb. 12, 2016, now Pat. No. 10,083,055.

(51) Int. Cl.
*H04L 29/08* (2006.01)
*H04L 29/12* (2006.01)

(52) U.S. Cl.
CPC ...... *H04L 61/6022* (2013.01); *H04L 67/1002* (2013.01); *H04L 67/12* (2013.01); *G06F 2009/4557* (2013.01); *G06F 2009/45595* (2013.01); *H04L 61/103* (2013.01); *H04L 67/1017* (2013.01)

(58) Field of Classification Search
CPC . H04L 67/12; H04L 61/6022; H04L 67/1002; H04L 61/103; H04L 67/1017
See application file for complete search history.

(56) References Cited

U.S. PATENT DOCUMENTS

| | | | |
|---|---|---|---|
| 9,176,764 B1* | 11/2015 | Jorgensen | G06F 9/4555 |
| 9,215,551 B2* | 12/2015 | Yang | H04W 72/04 |
| 9,313,281 B1* | 4/2016 | Lietz | H04L 67/16 |
| 9,606,817 B1* | 3/2017 | Efstathopoulos | G06F 9/45533 |
| 9,806,979 B1* | 10/2017 | Felstaine | H04L 41/0893 |
| 9,843,624 B1* | 12/2017 | Taaghol | H04L 63/0227 |
| 9,871,865 B2* | 1/2018 | Shaashua | H04L 12/2818 |
| 9,923,821 B2* | 3/2018 | Nolan | H04L 47/25 |
| 9,940,752 B2* | 4/2018 | Tommy | G06F 3/011 |
| 9,942,148 B1* | 4/2018 | Sivaramakrishnan | H04L 45/72 |
| 2008/0134178 A1* | 6/2008 | Fitzgerald | G06F 9/45537 718/1 |
| 2011/0265168 A1* | 10/2011 | Lucovsky | H04L 63/083 726/7 |
| 2013/0232463 A1* | 9/2013 | Nagaraja | G06F 8/61 717/101 |
| 2014/0055466 A1* | 2/2014 | Petrov | G09G 5/363 345/520 |
| 2014/0079207 A1* | 3/2014 | Zhakov | H04M 3/5175 379/265.03 |
| 2014/0229945 A1* | 8/2014 | Barkai | G06F 9/45533 718/1 |
| 2014/0241354 A1* | 8/2014 | Shuman | H04L 12/281 370/390 |
| 2014/0244834 A1* | 8/2014 | Guedalia | H04W 4/21 709/224 |
| 2014/0298339 A1* | 10/2014 | Jani | G06F 21/50 718/1 |
| 2014/0317293 A1* | 10/2014 | Shatzkamer | G06F 9/45558 709/226 |
| 2015/0006695 A1* | 1/2015 | Gupta | H04W 4/70 709/223 |
| 2015/0019342 A1* | 1/2015 | Gupta | G06Q 30/0269 705/14.66 |
| 2015/0019710 A1* | 1/2015 | Shaashua | G06F 16/35 709/224 |
| 2015/0019714 A1* | 1/2015 | Shaashua | H04L 12/2818 709/224 |
| 2015/0128141 A1* | 5/2015 | Sinha | G06F 9/45558 718/1 |
| 2015/0134954 A1* | 5/2015 | Walley | H04W 12/069 713/168 |
| 2015/0163121 A1* | 6/2015 | Mahaffey | H04W 12/12 707/687 |
| 2015/0222621 A1* | 8/2015 | Baum | H04L 63/0823 726/9 |
| 2015/0229713 A1* | 8/2015 | Lu | H04W 52/0261 709/203 |
| 2015/0271102 A1* | 9/2015 | Antich | H04L 47/781 370/230 |
| 2015/0288622 A1* | 10/2015 | Fargano | H04L 41/5054 370/401 |
| 2015/0326448 A1* | 11/2015 | Chaudhary | H04L 41/5041 705/40 |
| 2015/0365278 A1* | 12/2015 | Chakrabarti | H04W 4/70 370/254 |
| 2015/0370586 A1* | 12/2015 | Cooper | G06F 12/0223 710/308 |
| 2016/0085594 A1* | 3/2016 | Wang | H04L 67/12 709/226 |
| 2016/0156513 A1* | 6/2016 | Zhang | H04W 4/70 709/220 |
| 2016/0212012 A1* | 7/2016 | Young | G06F 9/45558 |
| 2016/0246638 A1* | 8/2016 | Rinta-Aho | G06F 9/5055 |
| 2016/0261727 A1* | 9/2016 | Yang | H04L 65/4069 |
| 2016/0378554 A1* | 12/2016 | Gummaraju | G06F 9/5011 718/104 |
| 2017/0005820 A1* | 1/2017 | Zimmerman | G05B 15/02 |
| 2017/0006135 A1* | 1/2017 | Siebel | H04L 69/40 |
| 2017/0063815 A1* | 3/2017 | Smith | H04L 63/0428 |
| 2017/0149614 A1* | 5/2017 | Zheng | H04L 63/101 |
| 2017/0187625 A1* | 6/2017 | Nolan | H04L 67/2842 |
| 2017/0187807 A1* | 6/2017 | Clernon | H04L 41/0806 |
| 2017/0300350 A1* | 10/2017 | Ferris | G06F 9/45558 |
| 2017/0371692 A1* | 12/2017 | Connolly | G06F 9/45558 |
| 2018/0262388 A1* | 9/2018 | Johnson | G06Q 10/103 |
| 2019/0132301 A1* | 5/2019 | Banga | H04L 63/102 |
| 2019/0306035 A1* | 10/2019 | Scheib | G06F 3/0482 |

OTHER PUBLICATIONS

Intel Corporation. "Developing Solutions for the Internet of Things White Paper." (2014).

Gubbi, Jayavardhana, et al. "Internet of Things (IoT): A vision, architectural elements, and future directions." Future Generation Computer Systems 29.7 (2013): 1645-1660.

* cited by examiner

MANAGEMENT OF IOT DEVICES IN A VIRTUALIZED NETWORK

CROSS-REFERENCE TO RELATED APPLICATIONS

This application is a continuation of co-pending application Ser. No. 16/055,059, entitled "Management of IoT Devices in a Virtualized Network," filed on Aug. 4, 2018, which is a continuation of application Ser. No. 15/042,229, entitled "Management of IoT Devices in a Virtualized Network," filed on Feb. 12, 2016 and issued on Sep. 25, 2018 as U.S. Pat. No. 10,083,055, the contents of which are hereby incorporated by reference herein in their entirety.

TECHNICAL FIELD

Embodiments of the present disclosure relate to the Internet of Things (IoT), which refers to network-enabled devices having low-cost CPU, memory, specialized sensor and communication module, designed to serve specific purposes in narrow domains. Specifically, the disclosure relates to virtual machines and virtual functions used in the network to support functionality and features of IoT devices.

BACKGROUND

Internet of Things (IoT), also referred to as Machine-to-Machine (M2M), is in a tremendous growth phase encompassing several industry verticals. Based on the latest industry forecast, there will be 26 billion connected devices by 2020. Just within healthcare industry, IoT is expected to comprise a $117 billion market by 2020.

IoT devices are essentially light weight devices supporting low-cost CPU, memory, disk space, a specialized sensor and a communication module. Most IoT devices are designed to serve specific purposes in a particular domain, such as human wearables, home automation, retail environments, offices, factories, worksites, vehicles, and cities. IoT devices include a broad range of configurations ranging from those having basic device connectivity to some of the more complex wearable applications and enterprise-based services.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

It is expected that, at any given time, there will be millions of IoT devices connected to any one network operator's network. Of those devices, a large proportion will be in an idle state. The remaining devices will be connected with specific service requirements.

The management of IoT devices utilizes cloud computing technology, and ideally allows for on-demand scaling of server capacity to support services. A virtualized environment behaves similarly to a physical computer/server; a virtualized machine (VM) typically has all the components (memory, CPU, interface, ports) of a physical server and is generated by a hypervisor that partitions physical components and allocates them to the VM.

As used herein, a virtual function (VF) encompasses any type of virtual function that can be deployed in the virtualized infrastructure. Examples of VFs include a virtual network function (VNF), an application VF and a firewall VF. Moving network functions from hardware to software improves speed and flexibility, permitting network operators to service more customers at a lower cost.

As presently used, a "context" refers to information related to a user. Such information includes, but is not limited to, authentication, session management, access control or data flow (e.g. tunnel endpoints).

Figure 1:
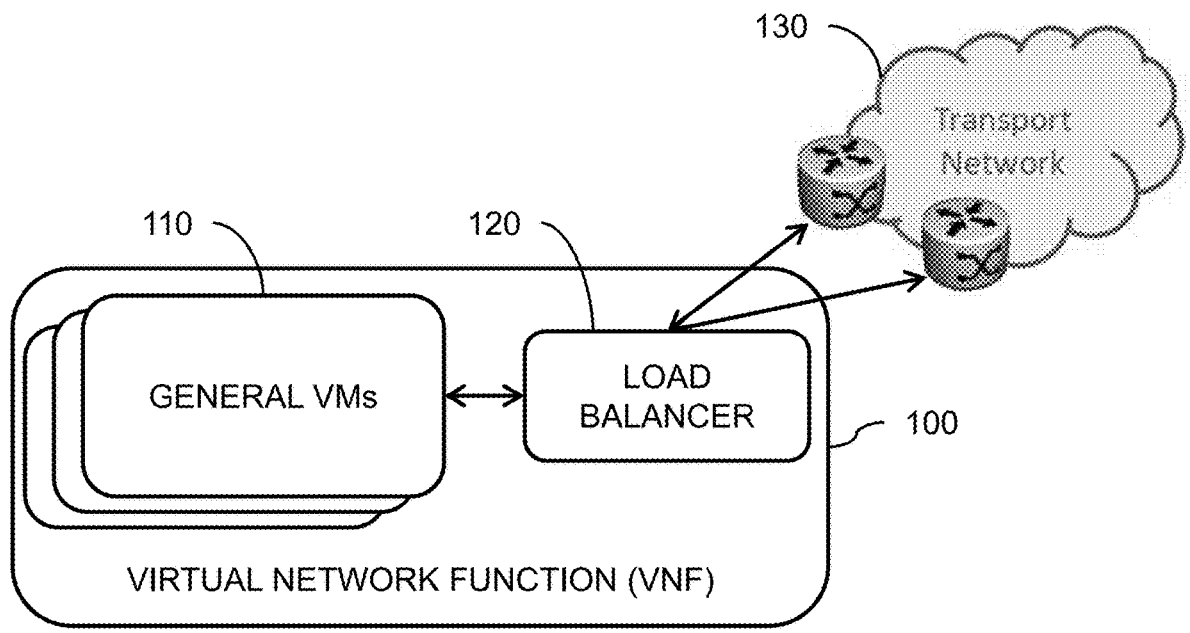
FIG. 1 is a block diagram showing an existing virtual machine arrangement.

As shown in FIG. 1, a state-of-the-art virtual network function 100 assigns contexts from the transport network 130 to general application processing virtual machines (VMs) 110 for instance of a mobility management entity (MME) or a gateway virtual function through a load-balancer 120 using, for example, a round robin assignment scheme. Assigned VMs 110 run full-feature software with the unified configuration and software load applicable to all contexts. There is no policy-based mechanism to map identical context(s) to VM(s) as determined by the IoT service types.

Scaling the capacity of virtual applications in the Cloud is typically accomplished by spinning additional VMs. The load balancing function 120 is employed across all the VMs to efficiently use the capacity of all the VMs. Typically, for a given application, all the VMs that handle user sessions are identical with respect to software feature functionality, parameter settings, CPU/RAM, etc. That allows for ease of operations, administration, and maintenance (OAM) since a single VM image is stored in the image repository, and used as a base version for creating new instances during capacity scale-out.

Figure 2:
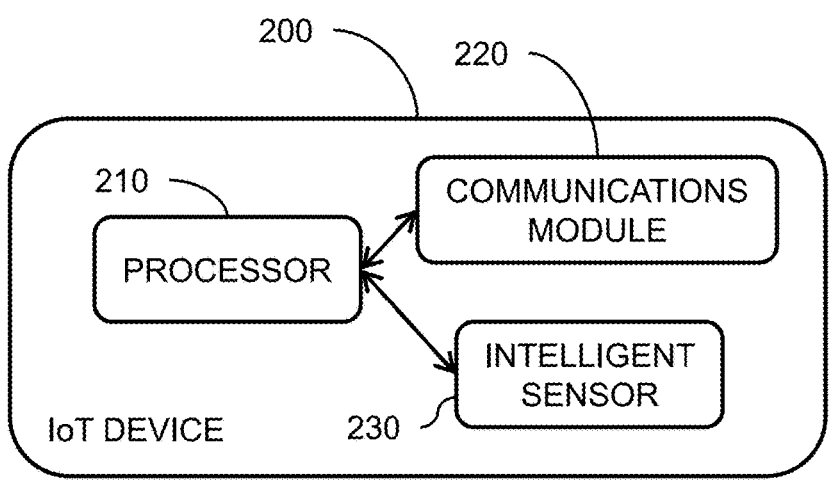
FIG. 2 is a block diagram showing an existing IoT device with major components.

IoT devices such as the device 200 shown in FIG. 2 are typically manufactured to serve a specific purpose, which is determined primarily by the intelligent sensor 230 resident in the device. The sensor 230, together with a wireless communication module 220, communicate with a processor 210 that coordinates the behavior of the device 200. The wireless communication module 220 contained in many IoT devices is somewhat generic.

The behavior for most IoT devices does not change over time. The behavior is typically predetermined based on the services for which the IoT device was intended. Behavioral characteristics include mobility pattern, frequency to access the network, and connectivity to a specialized service such as video, application server, messaging etc.

The call flows and the nature of session traffic that an IoT device handles typically do not change over time. The call flows and nature of session traffic may, however, vary widely between device types. For example, an IoT device installed at a factory to monitor corrosion will send information once every week, while a wearable IoT device such as heart rate monitor will send information every few minutes.

Having all the VMs within a virtual function support all features and functionality for all types of IoT device, including mobile subscribers, results in bloated and inefficient VMs. For example, an industrial sensor IoT device may measure a temperature in an industrial process being performed in a fixed manufacturing plant. That IoT device type does not require functionality normally associated with vehicle telematics, such as positioning and navigational functions. That IoT device type furthermore does not require functionality normally associated with a mobile communications device, such voice transmission. A generic virtual function assigned to that IoT device includes unused code and memory for performing those functions. That unused code and memory may adversely affect the speed and efficiency of the generic virtual function in handling the activities associated with the industrial sensor IoT.

Once the context of an IoT device is assigned to a VM, it is resident to the VM for an entire lifecycle; i.e., the life of a session or the life of a connection between the IoT device and the VM. An assigned VM responsible for handling the activities associated with a particular IoT device thus typically has significant capacity and functionality not needed for handling those activities. There is no existing policy-based mechanism to assign identical context(s) to VM(s) such that VMs can be scaled independently within the context of a Virtual Network Function (VNF) to handle specific IoT services such as vehicle telematics or home automation.

Signaling/control flow schemes have been proposed in which each virtualization request from a client is handled by a broker. The broker selects a virtualization server for creation of a virtual resource to handle the virtualization request. The selection of the virtualization server is based in part on context information contained in the request. Those signaling/control flow schemes, however, create generic virtual resources regardless of context.

The presently disclosed system optimizes resource usage within each virtual function by creating customized/specialized VMs for each unique type of IoT application. The VMs are created via custom software as well as custom configuration parameters to provide the same base core network functionality such as MME in a customized and optimized manner. Additionally, the disclosed system includes scaling in/out of each specialized type of virtual machine for a given IoT application type based on statistical utilization information at the intra-VF level (managed by an ICMP engine of the VF) as well as at service chain level (managed by a central ICMP orchestrator plugin that talks directly to the ICMP Engine in each VF). Thus, there is no broker and/or explicit signaling/messaging between IoT devices/clients and virtual functions for capacity scaling in/out the capacity.

In sum, while previous efforts have focused on a signaling/control flow mechanisms for brokering virtualization requests, the present disclosure focuses on design of a specific virtual network function via customized virtual machines for different types of IoT applications.

Figure 3:
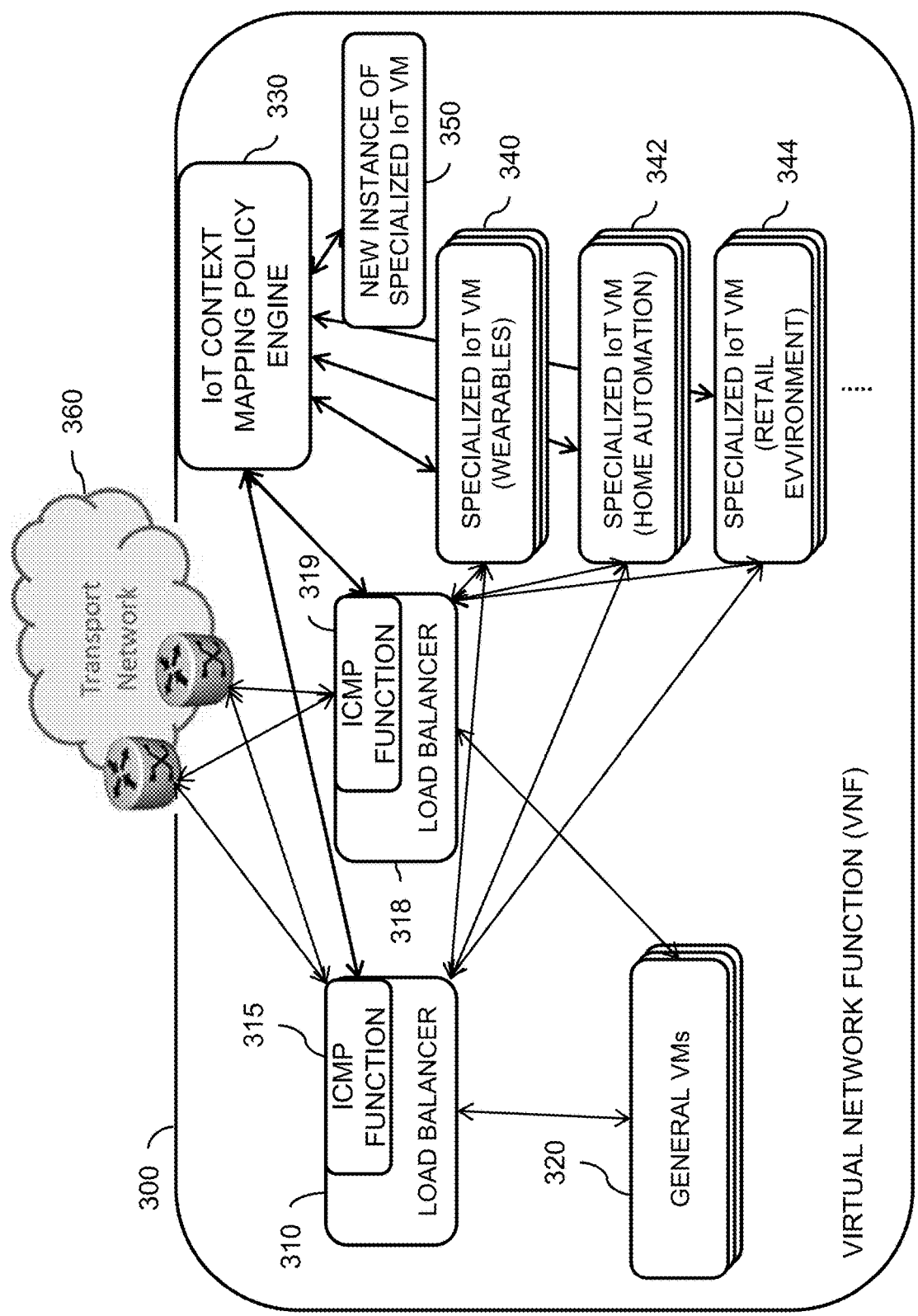
FIG. 3 is a block diagram showing an arrangement of virtual machines according to aspects of the present disclosure.

Specifically, the presently disclosed system includes an IoT context mapping policy (ICMP) engine 330 within the context of a VNF 300, as shown in FIG. 3. The VNF 300 is a virtualized infrastructure that provides a well-defined functional behavior. In examples of the presently disclosed system, the VNF 300 performs one or more subcomponent functions of the Evolved Packet Core (EPC), the main component of the 3GPP system architecture evolution (SAE). In other embodiments, the VNF 300 may perform another network function such as intrusion detection, intrusion prevention or routing.

The context mapping policy engine 330 utilizes IoT device identity to statically assign user sessions/contexts (data and control plane) to special purpose VMs such as a specialized IoT VM 340 for wearable devices, a specialized IoT VM 342 for home automation devices, or a specialized IoT VM 344 for devices used in the retail environment. Other examples include health monitoring and industrial automation. An IoT device that meets certain policy criteria is always assigned to a specific, specialized VM.

The IoT context mapping policy (ICMP) engine 330 defines a device-to-VM mapping policy for each device type based on criteria such as international mobile subscriber identity (IMSI), international mobile station equipment identity (IMEI), mobile station international subscriber directory number (MSISDN), or a device category. In addition to or in place of statically assigned identifiers, the ICMP engine 330 may base the mapping policy on a dynamically assigned device identifier such as a globally unique temporary identifier (GUTI). The ICMP engine 330 utilizes load statistics in real time to independently scale-up or scale-down specialized IoT VMs such as the VMs 340, 342, 344. The load statistics are gathered by ICMP functions 315, 319 in the load balancers 310, 318, which transmit the data to the IoT context mapping policy (ICMP) engine 330. The statistics include data applicable to each policy criteria set forth by the ICMP engine. For example, the statistics may include a number of IoT devices mapped to each instance of a specialized IoT VM, or a measure of traffic directed to and from each of the IoT devices.

The IoT context mapping policy function 315, 319 on the network load balancers 310, 318 enforces the policy criteria set forth by ICMP engine 330 to route the context to certain VMs. The policy criteria are configurable and allow updating, merging and splitting of policies for dynamic scaling of VMs. The IoT context mapping policy engine 330 manages the lifecycles of the specialized IoT VMs 340, 342, 344 based on the load statistics.

Based on the load statistics, the ICMP may spawn new instances of existing specialized IoT VMs 340, 342, 344 in cases where a predetermined load threshold is exceeded. For example, the ICMP may determine that the number of associated IoT devices per specialized IoT VM of a certain type exceeds a load statistics policy threshold, or a number of IoT devices associated with a particular specialized IoT VM exceeds a load statistics policy threshold. Alternatively, the ICMP may determine that the network traffic volume associated with one or more of a certain type of IoT VM exceeds a load statistics policy threshold. In either case, another IoT VM of that type is spawned to maintain the load statistics policy for the particular specialized IoT VMs below the threshold.

In another case, the ICMP 330 may receive a request from the load balancer 139 to map an IoT device to a specialized IoT VM of a type not yet existing in the VNF 300. In that case, if the ICMP determines that the IoT device may be mapped to a specialized IoT VM of a type for which a template is available, a new instance 330 of that type of specialized IoT VM is spawned. If no such template is available, then the IoT device is mapped to a general VM 320. That event may be logged for periodic review by a network manager to determine whether a new specialized IoT VM template should be created for that IoT device type.

The ICMP function 315, 319 is integrated in the load balancers 310, 318 and pulls the policy map from the ICMP engine 330. The ICMP function intercepts the first message exchange from a device and uses the ICMP policy map to route the packets and session of that device to an IoT VM of a certain type, or to a general purpose VM, as defined in the ICMP policy for that device type.

The specialized, service-optimized VMs 340, 342, 344 have customized software and configurations to efficiently utilize network resources and deliver optimal performance for a given service and IoT device type. An IoT service-optimized VM, such as the VMs 340, 342, 344, efficiently handles a specific service by running a specialized version of a generic VM 320. The specialized VMs are not simply light-weight versions of general VMs, but may also support functions that are not supported by the generic VMs. Examples of specialized VMs include a specialized VM to handle industrial applications, a specialized VM type to handle vehicle telematics, a specialized VM to handle a special class of wearable devices, etc.

In a system according to the disclosure, a plurality of specialized VM types are available for instantiation by the context mapping policy engine 330. A library or service catalog of templates for use in instantiating the various types of specialized VM types is available to the ICMP engine. The specialized VM types are customized and configured for different IoT use cases, and include the VM types from which the VMs 340, 342 344 were instantiated. In addition to those specialized VM types, general purpose VMs 320 are deployed in the network to handle IoT types that have not yet been assigned a specialized VM, and for IoT types with unpredictable behavior such as smart phones.

Figure 4:
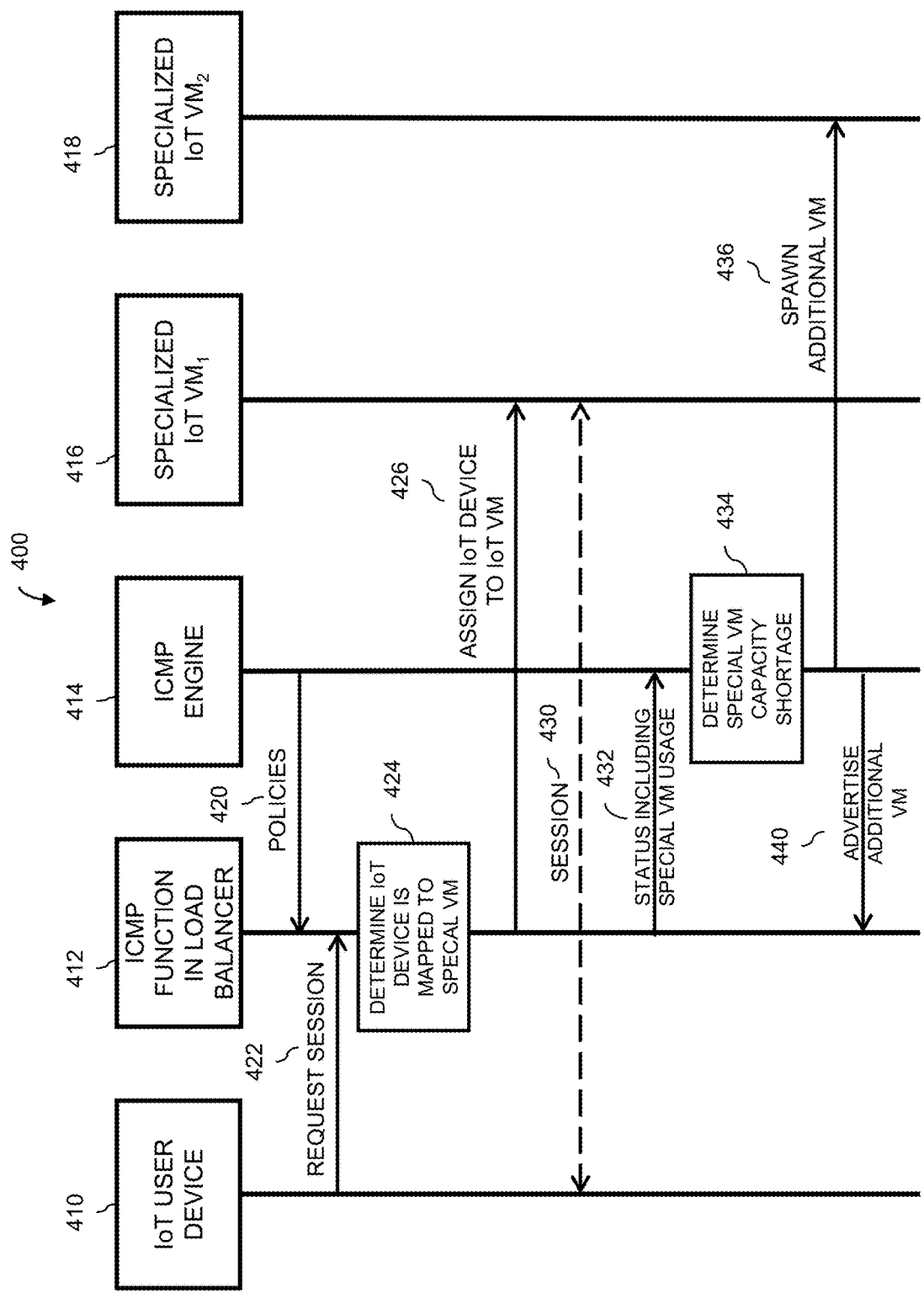
FIG. 4 is a sequence diagram showing operations according to aspects of the present disclosure.

An example use case is now described with reference to the sequence diagram 400 shown in FIG. 4. All virtual machines, such as the specialized VMs 416, 418, and also general application VMs (not shown), are instantiated within the context of a VNF. Also instantiated in the context of the VNF is the ICMP engine 414 and the ICMP function 412 in a load balancer.

VM routing policies 420 are defined in the ICMP engine 414 and are pulled by the ICMP function on the load balancers from ICMP engine. A first message exchange 422 from an IoT device 410 triggers the VM allocation function 412 on the load balancer. The message 422 is screened (via, e.g., deep packet inspection) for device identity and matched at operation 424 against the policy by the ICMP function 412. In some cases, the initial message 422 may bear several device IDs, as would be the case where the user device 410 includes an accessory such as a product scanner connected to a smart phone or tablet. The policies 420 received from the ICMP engine 414 include logic to deal with such multiple device IDs.

If the device identity matches a certain policy criteria, a message 426 is passed to the specialized IoT VM. If there is no match, or if the device is not assigned to a specialized VM, then a message is sent to a general VM (not shown). The context (user or control plane) is thus created in the selected VM. The load balancer 412 updates an internal mapping table and sends subsequent messages for the device to the selected VM 416 via a connection or session 430.

The ICMP function 412 sends load related statistics 432 applicable to each policy criteria to the ICMP engine 414. Those statistics may include, for example, usage data for each specialized VM. Based on the load related statistics 432, the ICMP engine determines at operation 434 whether there is a shortage or surplus of a particular specialized VM, and whether to scale-up or scale-down that specialized IoT VM. For example, if there is a shortage of a particular VM, such as in the case of increasing traffic, the ICMP engine will spawn (operation 436) an additional VM 418, and will advertise the new VM at operation 440 to the ICMP 412 in the load balancer.

The presently described special virtual machines, ICMP engine and ICMP load balancer functions may be deployed in each level of the EPC protocol stack. The EPC serves as the equivalent of general packet radio services (GPRS) networks via the mobility management entity (MME), serving gateway (SGW) and public data network gateway (PGW) subcomponents. The MME is an important control-node for the access-network, and is responsible for idle mode paging and tagging procedures including retransmissions. The SGW routes and forwards user data packets, and acts as a mobility anchor for network handovers. The PGW provides connectivity to external packet data networks by being the point of exit and entry of traffic for the user.

Figure 5:
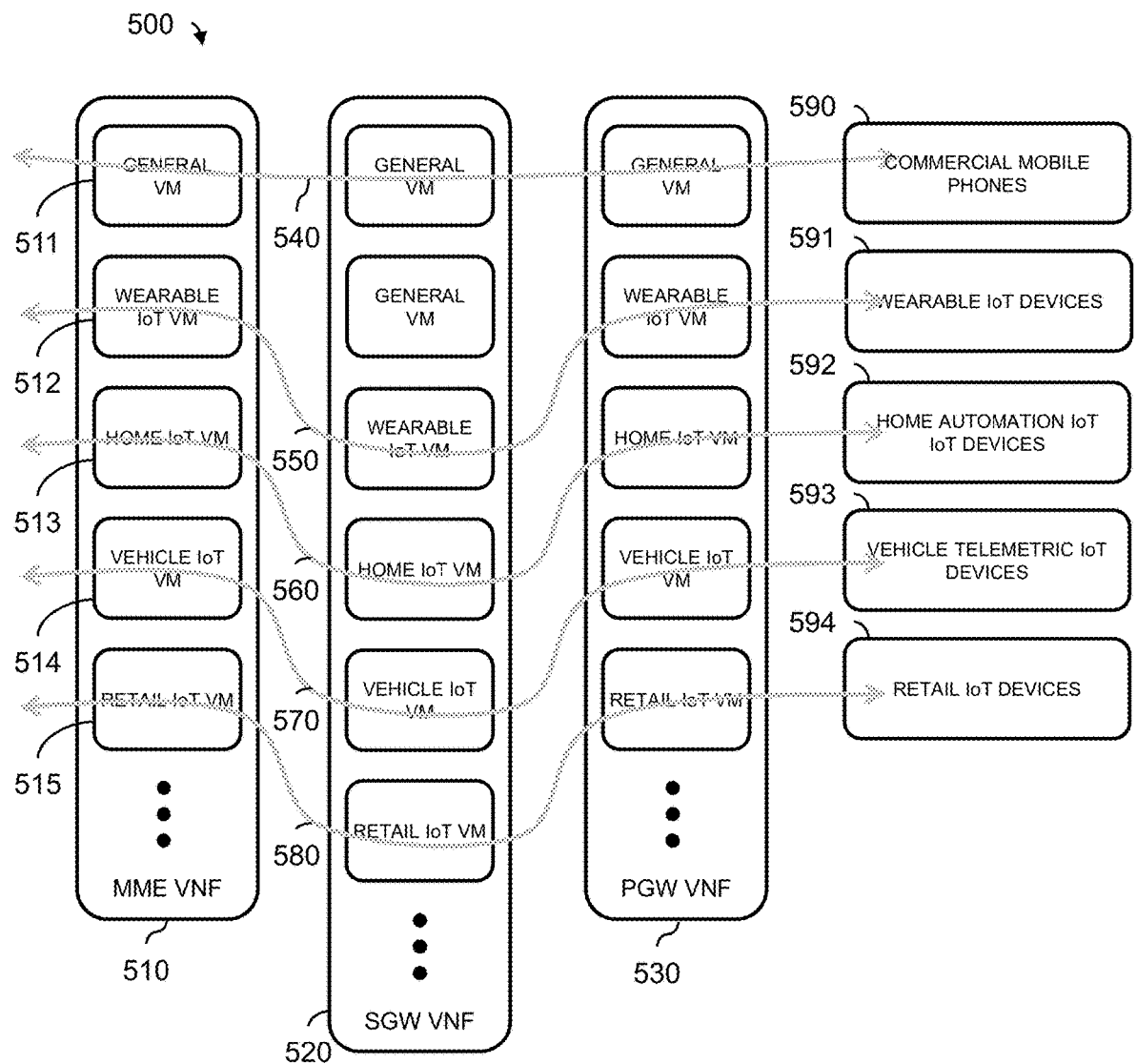
FIG. 5 is a block diagram showing a cloud service chain with scaling based on device type according to aspects of the present disclosure.

As shown in the block diagram 500 of FIG. 5, each virtual network function of the service chain, including the MME 510, the SGW 520 and the PGW 530, can independently decide which virtual machine is used based on device identity. For simplicity, the ICMP engine and load balancer functions are not shown.

In an exemplary service chain 540 of a commercial mobile phone 590 shown in FIG. 5, a general VM 511 is selected based on the device ID for use by a ICMP load balancer function (not shown) in the MME VNF 510. The selection is made based on the device ID of the commercial mobile phone 590. Independently, the SGW VNF and the PGW VNF select general VMs to process the service chain.

Other VMs are selected by the VNFs for other device types. In a service chain 550 of a wearable IoT device 591, wearable IoT VMs including IoT VM 512 are independently selected by each of the MME VNF, the SGW VNF and the PGW VNF. In a service chain 560 of a home automation IoT device 592, home automation IoT VMs including IoT VM 513 are independently selected by each of the MME VNF, the SGW VNF and the PGW VNF. In a service chain 570 of a vehicle telematics IoT device 593, vehicle telematics IoT VMs including IoT VM 514 are independently selected by each of the MME VNF, the SGW VNF and the PGW VNF. In a service chain 580 of a retail IoT device 594, retail IoT VMs including IoT VM 515 are independently selected by each of the MME VNF, the SGW VNF and the PGW VNF. Other VNFs in the service chain are not shown.

The ICMP load balancer function in each VNF 510, 520, 530 makes the classification independently based on the device ID and based on the policy established by the ICMP engine in that VNF. Further, the ICMP engine in each VNF may perform independent scaling for each of the IoT VMs. The scaling may be performed according to volumes of each of the IoT services performed by the VMs.

Figure 6:
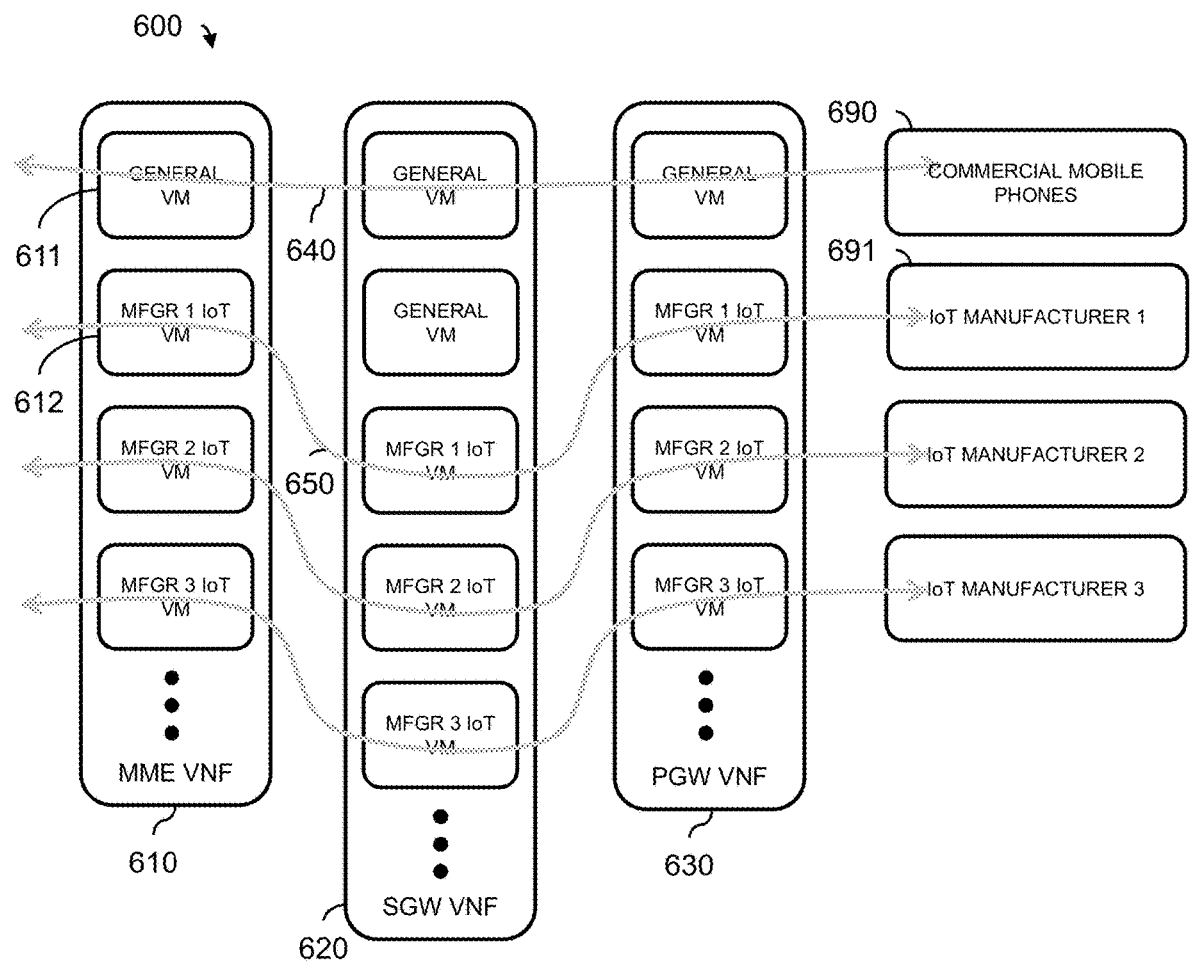
FIG. 6 is a block diagram showing a cloud service chain with scaling based on device manufacturer according to aspects of the present disclosure.

Alternatively, as shown in the block diagram 600 of FIG. 6, the IoT devices may be identified by device manufacturer or provider. In a service chain 640 of a mobile commercial phone 690, general VMs including general VM 611 are independently selected by each of the MME VNF, the SGW VNF and the PGW VNF. Other VNFs in the service chain are not shown. In a service chain 650 of a first manufacturer's IoT device 691, Manufacturer 1 IoT VMs including IoT VM 612 are independently selected by each of the MME VNF 610, the SGW VNF 620 and the PGW VNF 630, and so on for other device manufacturers. In that case, scaling may be performed according to a number of devices provided by each manufacturer that are connected to the network. The number of VMs in the network servicing each manufacturer's devices is then known, and manufacturers may be billed by the network operator according to that metric.

Additionally, the VMs in the network servicing a particular manufacturer's devices do not communicate with VMs in the network servicing other manufacturers' devices. That characteristic enhances security by reducing access to data.

Figure 7:
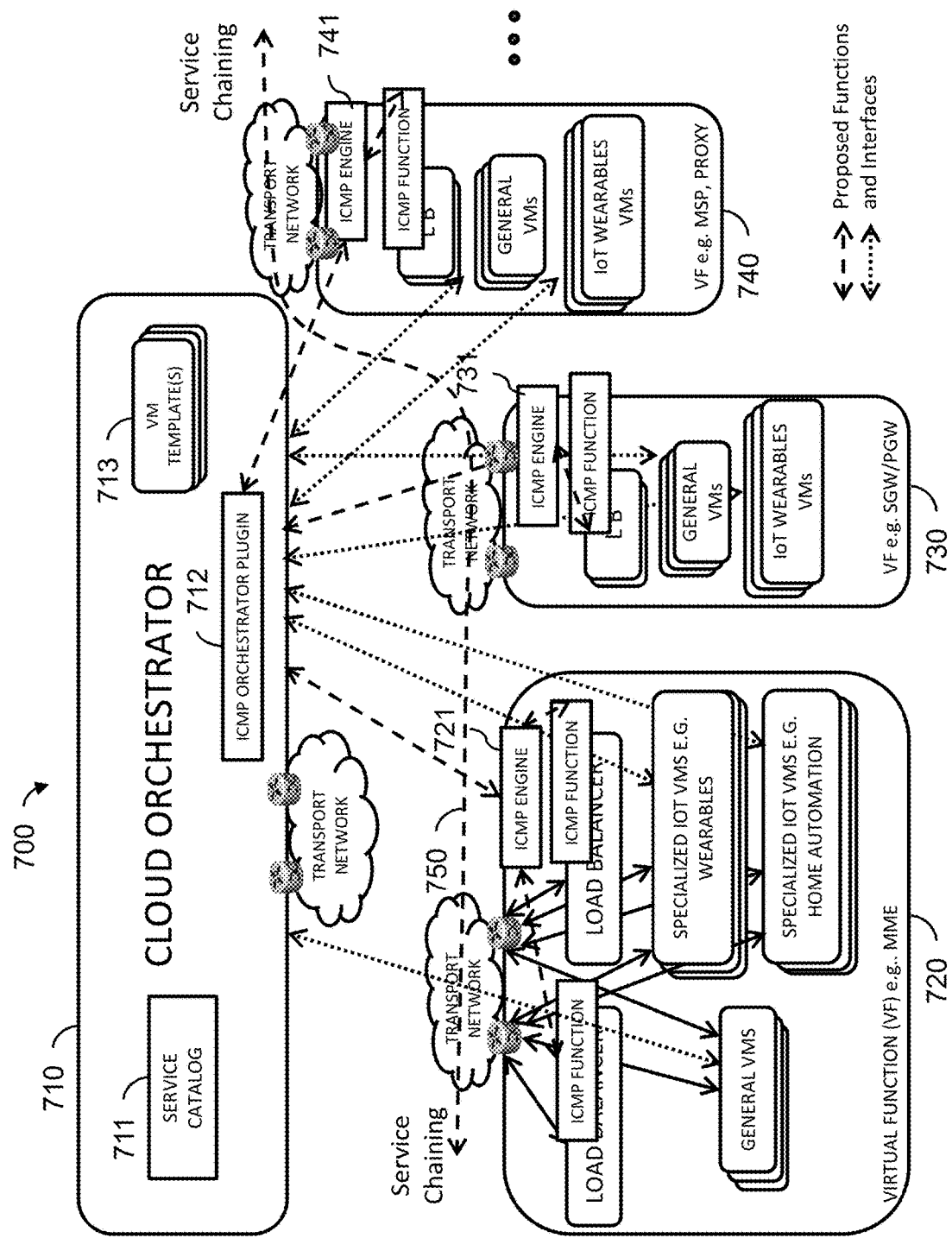
FIG. 7 is a block diagram showing a network arrangement including a cloud orchestrator with IoT Context Mapping Policy (ICMP) plug-in according to aspects of the present disclosure.

As shown in the block diagram 700 of FIG. 7, an adaptable IoT application service catalog 711 of VMs for each IoT application may reside in a cloud orchestrator 710. The cloud orchestrator arranges various cloud components to achieve a desired result. In that process, tasks are combined into workflows so the provisioning and management of various IT components and their associated resources can be automated. In a cloud environment, the process is complicated because it involves interconnecting processes running across heterogeneous systems in multiple locations. A cloud orchestrator simplifies the intercomponent communication and connections to other apps and users and ensures that links are correctly configured and maintained.

The service catalog 711 has a listing of required specialized and general VMs for each IoT application in the end-to-end network. By controlling the selection of a particular VM for a particular class of IoT, the cloud orchestrator 710 is therefore capable of enhanced control over how IoT devices are handled in each virtual function 720, 730, 740. The capability of the cloud orchestrator 710 to orchestrate workflows is also improved because inputs and outputs of the specialized virtual machines are customized to reflect the actual characteristics of the IoT devices, making more streamlined workflows possible. The specialized virtual machines may further be updated, merged or split by the orchestrator. Cloud orchestrator policy may be set with enhanced precision because the rules governing in the ICMP engines 721, 731, 741 may be fine-tuned to target certain IoT device types with certain treatment. Policy setting at such a fine granularity is not possible with generic virtual machines.

For example, a service catalog entry for a home automation IoT application lists a home-automation-specialized VM for vMME, a home-automation-specialized VM for vSGW, and a home-automation-specialized VM for vPGW. The home-automation IoT application catalog entry will also list general purpose VMs for vPCRF and other EPC elements.

The service catalog entry for a VM may also include network/compute resources requirements such as vCPU, memory utilization, etc. For example, a wearables-specialized IoT application entry in the catalog 711 lists a wearables-specialized IoT vMME VM, including $n_1$ vCPUs, $k_1$ GB of memory, etc. The entry also lists a wearables-specialized vSGW VM, including $n_2$ vCPUs, $k_2$ GB of memory, etc.

An IoT context mapping policy orchestration plugin function 712 within the context of the cloud orchestrator 710 uses the IoT application catalog 711, and coordinates and manages the life-cycle of IoT-optimized VM(s) of VFs across the virtual functions 720, 730, 740 in the service chaining 750. For example, the cloud orchestrator 710 can scale up the specialized VMs associated with a specific IoT application such as home-automation for all the VFs in the service chain 750 without impacting service chain capacity for non-IoT devices as well as other IoT applications.

The ICMP orchestrator plugin 712 monitors health, instantiates and terminates specialized VM(s) along the entire service chain as needed based upon on-demand service and device type scalability. In that way, the ICMP orchestrator plugin can re-purpose VMs from specialized VMs to general VMs and vice-versa.

The ICMP orchestrator plugin 712 communicates with the ICMP engines 721, 731, 741 of each VNF 720, 730, 740 to additionally configure the ICMP rules for newly added or deleted VMs of the selected IoT application. VM templates 713 are stored and maintained within the cloud orchestrator 710 for use by the ICMP engines 721, 731, 741 in instantiating VMs.

Within each category of IoT VMs, multiple VMs of that category are deployed to support independent capacity scale out. For example, $n_1$ customized VMs are deployed for health monitoring, $n_2$ VMs for vehicular networks, $n_3$ VMs for industrial monitoring, $n_4$ VMs for general purpose, among others.

In the context of wireless networks, the disclosed context mapping policy engine is used with IoT devices that have a unique identity. For example, the technique may be used with devices having an IMSI, an IMEI, a MSISDN, etc. The device identity must not be interchangeable and must serve a very specific purpose, such that the ICMP engine 330 can pre-determine and pre-allocate contexts to VMs.

The disclosed solution is not only applicable to a virtualized EPC cloud of a mobile wireless network, but also to any IT cloud infrastructure that manages services and dynamically allocates contexts based on device identity to VMs for optimal performance. In example embodiments, the device identity may be a browser type, an IP address, active applications, etc.

The proposed solution can be applied to discrete virtual network functions to provide a unified anchoring mechanism of IoT contexts to corresponding specialized IoT VMs when the disclosed IoT context mapping policies for each of the VNFs are aligned.

The presently disclosed IoT context mapping policy arrangement permits independent network scaling specific to each IoT device type or service. The independent capacity scaling may be based on IoT service type or on the IoT manufacturer or a combination of both. This is possible because the network is aware of the number of each connected device type. Optimized and customized network software for the different IoT applications may use that data to instantiate or tear down specialized VMs as needed.

A network provider may realize additional revenue through special IoT service offerings. Because the proposed solution can be implemented for end-to-end delivery such that each network function utilizes a consistent IoT device to VM policy, the provider is able to track usage.

The experience of IoT users may be enhanced by the use of the disclosed specialized IoT VMs. Because the IoT devices are anchored to corresponding specialized IoT VMs, configuration parameters can be fine-tuned for IoT service type. Network operators or suppliers can choose to add unique functionality applicable to a particular IoT service.

The disclosed system may also reduce operational costs. Software upgrades and buyout costs may be more discrete and IoT service-specific, which will benefit both the network operators and suppliers in price negotiations. Billing may be facilitated because server usage may be assigned to individual IoT device manufacturers or providers. For example, a healthcare provider may be billed based on server usage of health monitoring VMs used for that healthcare provider's devices. The devices are identified, for example, using a unique device id range.

The hardware and the various network elements discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," comprising, "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A context mapping policy engine, comprising:
   one or more processors;
   a communications interface with a virtualized network containing network enabled devices of a first device type and network enabled devices of a second device type;
   at least one computer-readable storage device having stored thereon computer readable instructions for managing network-enabled devices, wherein execution of the computer readable instructions by the one or more processors causes the processors to perform operations comprising:
      receiving, from a context mapping policy function integrated in a network load balancer, status data reflecting a quantity of network-enabled devices of the first device type being handled by a first specialized virtual machine, the first specialized virtual machine including functions required for handling the first device type and lacking functions required for handling the second device type;
      determining that additional network capacity is needed for handling the first device type;
      based on the determining that additional network capacity is needed, instantiating a third specialized virtual machine including functions required for handling the first device type and lacking functions required for handling the second device type; and
      transmitting from the context mapping policy engine to the context mapping policy function integrated in the network load balancer, an advertisement of the third specialized virtual machine for use in updating an internal mapping table of the network load balancer.

2. The context mapping policy engine of claim 1, wherein the context mapping policy function integrated in the network load balancer determines that the network-enabled devices are of the first device type using at least one device identifier selected from the group consisting of a MAC address, an international mobile subscriber identity (IMSI), an international mobile station equipment identity (IMEi), a mobile station international subscriber directory number (MSISDN) and a dynamically assigned device identifier.

3. The context mapping policy engine of claim 1, wherein the virtualized network comprises at least one general purpose virtual machine for handling devices types other than the first device type and the second device type.

4. The context mapping policy engine of claim 1, wherein the network-enabled devices utilize a service chain comprising a plurality of virtual functions and each virtual function comprises an additional context mapping policy engine.

5. The context mapping policy engine of claim 4, wherein the virtualized network further comprises a context mapping policy orchestrator plugin within a context of a cloud orchestrator in the virtualized network, the operations further comprising:
  by the context mapping policy orchestrator plugin, coordinating life cycles of specialized virtual machines in each of the plurality of virtual functions in the service chain.

6. The context mapping policy engine of claim 5, wherein the operations further comprise:
  by the context mapping policy orchestrator plugin, repurposing a general purpose virtual machine for use as a fourth specialized virtual machine including functions required for handling the first device type and lacking functions required for handling the second device type.

7. The context mapping policy engine of claim 6, wherein the operations further comprise:
  receiving from the context mapping policy orchestrator plugin a communication for configuring rules for instantiating new specialized virtual machines.

8. The context mapping policy engine of claim 1, wherein the operations further comprise:
  receiving, from the context mapping policy function, data reflecting receipt of an initial message from a network-enabled device of a third device type not being handled by any instantiated specialized virtual machine;
  determining that a template exists for instantiating an additional specialized virtual machine for handling the third device type;
  transmitting to a cloud orchestrator a request to retrieve the template for instantiating the additional specialized virtual machine.

9. A method, comprising:
  by a context mapping policy engine in a virtualized network, receiving, from a context mapping policy function integrated in a network load balancer, status data reflecting a quantity of network-enabled devices of a first device type being handled by a first specialized virtual machine, the first specialized virtual machine including functions required for handling the first device type and lacking functions required for handling a second device type;
  by the context mapping policy engine, receiving, from the context mapping policy function, status data reflecting a quantity of network-enabled devices of the second device type being handled by a second specialized virtual machine, the second specialized virtual machine including functions required for handling the second device type and lacking functions required for handling the first device type;
  by the context mapping policy engine, determining that additional network capacity is needed for handling the first device type;
  by the context mapping policy engine, based on the determining that additional network capacity is needed, causing a third specialized virtual machine to be instantiated, the third specialized virtual machine including functions required for handling the first device type and lacking functions required for handling the second device type; and
  by the context mapping policy engine, transmitting to the context mapping policy function integrated in the network load balancer, an advertisement of the third specialized virtual machine for use in updating an internal mapping table of the network load balancer.

10. The method of claim 9, further comprising:
  by the context mapping policy function associated with the network load balancer, determining that the network-enabled device is of the particular device type using at least one device identifier selected from the group consisting of a MAC address, an international mobile subscriber identity (IMSI), an international mobile station equipment identity (IMEi), a mobile station international subscriber directory number (MSISDN) and a dynamically assigned device identifier.

11. The method of claim 10, further comprising:
  by the context mapping policy engine, receiving from an operator a mapping of device identifiers to specialized virtual machines.

12. The method of claim 9, wherein the virtualized network comprises at least one general purpose virtual machine for handling device types not handled by specialized virtual machines.

13. The method of claim 9, wherein the network-enabled devices utilize service chains comprising a plurality of virtual functions, each virtual function comprises a context mapping policy engine executing the above operations.

14. The method of claim 13, wherein the virtualized network further comprises a context mapping policy orchestrator plugin within a context of a cloud orchestrator in the virtualized network, the method further comprising:
  by the context mapping policy orchestrator plugin, coordinating life cycles of specialized virtual machines in each of the plurality of virtual functions in the service chain.

15. The method of claim 14, further comprising:
  by the context mapping policy orchestrator plugin, repurposing a general purpose virtual machine for use as a fourth specialized virtual machine including functions required for handling the first device type and lacking functions required for handling the second device type.

16. The method of claim 9, further comprising:
  by the context mapping policy engine, receiving from the context mapping policy orchestrator plugin a communication for configuring rules for instantiating new specialized virtual machines.

17. The method of claim 9, further comprising:
  by the context mapping policy engine, receiving, from the context mapping policy function, data reflecting receipt of an initial message from a network-enabled device of third device type not being handled by any instantiated specialized virtual machine;
  by the context mapping policy engine, determining that a template for an additional specialized virtual machine exists for handling the particular device type;
  by the context mapping policy engine, transmitting to a cloud orchestrator a request to retrieve the template for the additional specialized virtual machine from a service catalog.

18. A computer-readable storage device having stored thereon computer readable instructions for network management by a load balancer in a virtualized network, wherein execution of the computer readable instructions by a processor causes the processor to perform operations comprising:
  receiving, from a context mapping policy function integrated in a network load balancer, status data reflecting a quantity of network-enabled devices of a first device type being handled by a first specialized virtual machine, the first specialized virtual machine including functions required for handling the first device type and lacking functions required for handling a second device type;

receiving, from the context mapping policy function, status data reflecting a quantity of network-enabled devices of the second device type being handled by a second specialized virtual machine, the second specialized virtual machine including functions required for handling the second device type and lacking functions required for handling the first device type;

determining that additional network capacity is needed for handling the first device type;

based on the determining that additional network capacity is needed, causing a third specialized virtual machine to be instantiated, the third specialized virtual machine including functions required for handling the first device type and lacking functions required for handling the second device type; and transmitting to the context mapping policy function integrated in the network load balancer, an advertisement of the third specialized virtual machine for use in updating an internal mapping table of the network load balancer.

19. The computer-readable storage device of claim 18, wherein the operations further comprise:

by the context mapping policy function associated with the network load balancer, determining that the network-enabled device is of the particular device type using at least one device identifier selected from the group consisting of a MAC address, an international mobile subscriber identity (IMSI), an international mobile station equipment identity (IMEi), a mobile station international subscriber directory number (MSISDN) and a dynamically assigned device identifier.

20. The computer-readable storage device of claim 18, wherein the virtualized network comprises at least one general purpose virtual machine for handling device types not handled by specialized virtual machines.

* * * * *